US00RE47980E

(19) United States
(12) Reissued Patent
Vosteen et al.

(10) Patent Number: US RE47,980 E
(45) Date of Reissued Patent: May 12, 2020

(54) PROCESS FOR REMOVING MERCURY FROM FLUE GASES

(71) Applicant: Bromerc Limited, Central (HK)

(72) Inventors: Bernhard Vosteen, Cologne (DE); Rico Kanefke, Odenthal (DE); Ewa Kanefke, Odenthal (DE); Claus Mueller, Kuerten (DE); Michael Nolte, Essen (DE); Heinz Koeser, Merseburg (DE); Joachim Beyer, Kuerten (DE); Theodore-Gerhard Bonkhofer, Essen (DE); Olaf Fleth, Grevenbroich (DE); Andrea Schnitzer, Hausmannstaetten (AT); Andreas Pohontsch, Grossroehrsdorf (DE)

(73) Assignee: Bromerc Limited, Central (HK)

(21) Appl. No.: 14/658,322

(22) Filed: Mar. 16, 2015

Related U.S. Patent Documents

Reissue of:
(64) Patent No.: 6,878,358
Issued: Apr. 12, 2005
Appl. No.: 10/430,088
Filed: May 6, 2003

(30) Foreign Application Priority Data

Jul. 22, 2002 (DE) ..... 10 233 173

(51) Int. Cl.
*B01D 53/64* (2006.01)

(52) U.S. Cl.
CPC ..... *B01D 53/64* (2013.01)

(58) Field of Classification Search
CPC ..... B01D 53/64
See application file for complete search history.

(56) References Cited

U.S. PATENT DOCUMENTS 4,729,882 A 3/1988 Ide et al.
4,843,980 A 7/1989 Markham et al.
5,238,488 A * 8/1993 Wilhelm ..... 75/742
(Continued)

FOREIGN PATENT DOCUMENTS

CA 2150529 12/1995
DE 42 18 672 C1 8/1993 ..... F23G 7/00
(Continued)

OTHER PUBLICATIONS

Inter Partes Reexamination 95/001,587, Right of Appeal Notice, 2013.*

(Continued)

*Primary Examiner* — Jerry D Johnson
(74) *Attorney, Agent, or Firm* — Bachman & LaPointe, PC

(57) ABSTRACT

Process for removing mercury from flue gases of high-temperature plants, in particular power stations and waste incineration plants in which a bromine compound is fed to the multistage furnace and/or the flue gas in a plant section downstream of the furnace, the temperature during contact of the bromine compound with the flue gas being at least 500° C., preferably at least 800° C. The combustion is carried out in the presence of a sulphur compound, in particular sulphur dioxide. Subsequently to the furnace, the flue gas is subjected to an optional multistage cleanup for removing mercury from the flue gas, which cleanup comprises a wet scrubber and/or a dry cleanup.

19 Claims, 9 Drawing Sheets

(56) References Cited

U.S. PATENT DOCUMENTS

| | | | | |
|---|---|---|---|---|
| 5,435,980 | A | 7/1995 | Felsvang et al. | |
| 5,695,726 | A | 12/1997 | Lerner | |
| 5,787,823 | A | 8/1998 | Knowles | |
| 5,809,910 | A | 9/1998 | Svendssen | |
| 5,900,042 | A * | 5/1999 | Mendelsohn et al. | 75/742 |
| 6,027,551 | A | 2/2000 | Hwang et al. | |
| 6,808,692 | B2 | 10/2004 | Oehr | |
| 6,974,564 | B2 | 12/2005 | Biermann et al. | |
| 2002/0114749 | A1 | 8/2002 | Cole | |
| 2002/0114750 | A1 | 8/2002 | Holste et al. | |

FOREIGN PATENT DOCUMENTS

| | | | | |
|---|---|---|---|---|
| DE | 44 22 661 | A1 | 1/1996 | B01D 53/34 |
| DE | 19850054 | A1 * | 5/2000 | B01D 53/77 |
| EP | 0016290 | | 10/1980 | |
| EP | 138665 | | 4/1985 | |
| EP | 0 208 036 | B1 | 10/1989 | B01D 53/34 |
| EP | 0 709 128 | A2 | 5/1996 | B01D 53/94 |
| JP | 3023102 | | 3/2000 | |
| JP | 02000197811 | A * | 7/2000 | B01D 53/64 |
| WO | WO9093518 | | 7/2009 | |

OTHER PUBLICATIONS

Inter Partes Reexamination 95/001,587, Patent Trial and Appeal Board Decision on Reconsideration, 2014.*

Inter Partes Reexamination 95/001,587, Patent Trial and Appeal Board Decision, 2014.*

Inter Partes Reexamination 95/001,368, Patent Trial and Appeal Board Decision, 2013.*

Fujiwara, N., et al., "Mercury Transformation Behavior on a Bench-scale [sic] Coal Combustion Furnace", Advances in Air Pollution, 10 (Air Pollution IX), (2001), pp. 395-404.

Granite et al., Sorbents for Mercury Removal from Flue Gas, US Department of Energy (Jan. 1998).

Harlow et al., "Ash Vitrification—A Technology Ready for Transfer", presented at the National Waste Processing Conference, 14th Biennial Conference, Long Beach, CA Jun. 3-Jun. 6, 1990, pp. 143-150.

The Fire Below: Spontaneous Combustion in Coal, Environment Safety & Health Bulliten, US Department of Energy, DOE/EH-0320 Issue 93-4, May 1993.

Beer, J.M., "Combustion Technology Developments in Power Generation in Response to Environment Challenges", Progress in Energy and Combustion Science 26 (2000), pp. 301-327.

Ganapathy, V., "Recover Heat From Waste Incineration", Hydrocarbon Processing (Sep. 1995).

Hower, James C. et al., "Mercury Capture by Native Fly Ash Carbons in Coal-Fired Power Plants", Progress in Energy and Combustion Science 36 (2010) pp. 510-529.

Onizuka Shigenori, et al., "Dry-type Desulfurizaton of Boiler Flue Gases" (Hitachi Zosen Corp., Japan) (1990), 5.

Moberg, P.O., et al., "Migration of Trace Elements During Flue Gas Desulfurization", Report (1982), (KHM-TR-28; Order No. DE83705619, 101.

Element Analysis of Coalqual Data. http://energy.er.usgs.gov/temp.htm.

Janaf Thermochemical Tables, Dec. 5, 2000, J. Phvs. Ehcm. Data, V L 14, Suppl. 1., 1985.

Julien, S. et al., "The Effect of Halides on Emissions From Circulating Fluidized Bed Combustion of Fossil Fuels" Fuel vol. 75, No. 14, pp. 1655-1663, 1996 Elsevier Science Ltd.

Senior, Constance, L., et al., "Gas-Phase Transformations of Mercury in Coal-Fired Power Plants", Fuel Processing Technology 63 (2000) pp. 197-213.

Galbreath, Kevin C. et al., "Mercury Transformation in Coal Combustion" Fuel Processing Technology 65-66 (2000), pp. 289-310.

Kaneko, M., Pitting of stainless steel in bromide, chloride and bromide/chloride solutions, Corrosion Science 42 (2000), pp. 67-78.

Hall, "Chemical Reactions of Mercury in Combusoin Flue Gases",Water, Air and Soil Pollution, 56: 3-14, (1991).

Ghorishi, et al., "An Environmental Study on Mercury Sorportion by Activated Carbons and Calcium Hydroxide", US Environmental Protection Agency, Report EPA/600/A-98/011 (1998).

Brydger Van Otten et al., "Gas Phase Oxidation of Mercury by Bromine and Chlorine in Flue Gas, Energy & Fuels", ACS Publicatoins, 2011, 25 pp. 3530-3536.

Chun Wai Lee et al., "Mercury Control Research: Effects of Fly Ash and Flue Gas Parameters on Mercury Speciation", Annual Waste-to-energy Conference, Proceedings of 6th Miami Beach, FL, Unites States May 11-13, 1998.

Evan J. Granite et al., "Novel Sorbents for Mercury Removal from Flue Gas", Separations, Ind. Eng, Chem. Res. 2000, 39, pp. 1020-1029.

Elliot et al., "Operation of Fibric Filters". Lesson 4 & 10, WCPA News, Fall 2007 Issue.

Shoichi, Takao et al; 2000197811 A; Patent Abstracts of Japan; Jul. 18, 2000.

* cited by examiner

Amended

Amended

PROCESS FOR REMOVING MERCURY FROM FLUE GASES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a continuation-in-part of application Ser. No. 10/202,571, filed Jul. 24, 2002, still pending.

The invention relates to a process for removing mercury from flue gases of high-temperature plants, in particular power stations and waste incineration plants.

BACKGROUND OF THE INVENTION

Owing to the high toxicity of mercury, in particular of organically bound mercury, which is also absorbed by humans directly or indirectly via the food chain, strict limiting values exist for the legally permissible emission of mercury, for example from incineration plants and power stations. Despite the currently already low mercury concentrations of clean gas,—the half-hourly mean value currently permissible in Germany for mercury emissions from waste incineration plants is 30 $\mu g/m^3$ S.T.P. dry basis (S.T.P. db),—owing to high volumetric flow rates, for example from large power stations, considerable mercury loadings are achieved, so that further reduction of the currently permitted limiting values is sought.

A range of processes for reducing mercury emissions from power stations, waste incineration plants or the like are known from the literature. Which of the processes is expedient for a particular application depends greatly on the introduced load and on the chlorine content of the material to be burned. At a high chlorine content the proportion of ionic mercury in the flue gas is high. Ionic mercury may be readily removed in scrubbers. The quasi-water-insoluble metallic mercury can be converted into ionic mercury, for example by adding oxidizing agents, such as peroxides, ozone or sodium chlorite, in the boiler exit gas upstream of the flue gas cleaning system or in the dedusted boiler gas, and then removed in the flue gas cleaning system as for example in scrubbers. Further processes for removing mercury are: adding reactants, such as sodium tetrasulphite, to bind mercury by means of sulphur in the dirty boiler gas upstream of the flue gas emission control system or in partially cleaned up clean gas; improved scrubbing of ionic mercury by decreasing pH or pCl in the acid scrubber or by treatment with 1,3,5-triazine-2,4,6-trithiol (trimercapto-S-triazine, TMT) in the weakly acidic or weakly alkaline scrubber; removing ionic and metallic mercury by sorption with addition of pulverulent sorbents or atomized suspensions.

Previous techniques for reduction are not sufficiently effective and, owing to their sometimes high additional capital costs and the additional consumption of operating media are relatively expensive.

It is an object of the invention to provide a process for removing mercury, in particular for the substantially complete removal of mercury (Hg), from flue gases of high-temperature processes. The process is to find the broadest possible application, as in the case of essentially constant low Hg concentrations, for example in coal-fired power stations, but also in the case of relatively high Hg concentrations, for example in sewage sludge incineration, or very high Hg concentrations, for example in domestic waste or hazardous waste incineration. Furthermore, the process should not require extensive refitting of the high-temperature plants and should require the smallest possible amount of additional operating media, so that the process can be implemented and operated inexpensively.

SUMMARY OF THE INVENTION

The invention relates to a process for removing mercury from flue gases of high-temperature plants, in particular from power stations and waste incineration plants, in which bromine and/or a bromine compound and/or a mixture of various bromine compounds is fed to the if appropriate multistage furnace and/or to the flue gas in a plant section downstream of the furnace, the temperature during the contact of the bromine compound with the flue gas being at least 500° C., preferably at least 800° C., the combustion taking place in the presence of a sulphur compound, in particular sulphur dioxide, with or without the addition of sulphur and/or a sulphur compound and/or of a mixture of various sulphur compounds, and then the flue gas being subjected to an if appropriate multistage cleanup for removing mercury from the flue gas, which cleanup comprises a wet scrubber and/or a dry cleanup.

DETAILED DESCRIPTION

The removal of mercury from the flue gases in a flue gas emission control system downstream of the combustion or a similar high-temperature process is critically dependent on what species of mercury is present prior to entry into the flue gas emission control system. As high a proportion as possible of ionic mercury is advantageous, since the ionic mercury is readily water soluble, that is to say it can be scrubbed out, and is readily adsorbable to a range of adsorbents. The addition of bromine or bromine compounds to the furnace causes, under the given conditions of a high-temperature process or the like, in the presence of a sulphur compound, in particular in the presence of sulphur dioxide, a substantial, essentially complete, oxidation of the mercury and therefore allows substantial removal of the mercury from flue gases.

High-temperature plants in the context of the present invention are taken to mean in particular waste incineration plants, for example domestic waste, hazardous waste and sewage sludge incineration plants, and power stations, for example bituminous coal-fired or lignite-fired power stations, and also other plants for high-temperature processes, for example cement burning, and high-temperature plants co-fired with waste or combined (multistage) high-temperature plants, for example power stations or cement rotary kilns having an upstream waste pyrrolysis or waste gasification. The dimension of the high-temperature plant is not important for the inventive process. The advantageous process is advantageous precisely because it is applicable to various types of high-temperature plants and to high-temperature processes of varying order of magnitude. This encompasses plants having a flue gas volumetric flow rate of only $15 \cdot 10^3$ $m^3$ S.T.P. db/h, for example for sewage sludge incineration, or of $50 \cdot 10^3$ $m^3$ S.T.P. db/h, for example in hazardous waste incineration plants, or of $150 \cdot 10^3$ $m^3$ S.T.P. db/h, for example in domestic waste incineration, and also encompasses large power stations having, for example, $2\text{-}3 \cdot 10^6$ $m^3$ S.T.P. db/h.

It is not critical for the inventive process in what form the bromine supplied is present. It is possible to use free or organically bound or inorganically bound bromine. The bromine or the bromine compounds can be fed individually or in a mixture. Particularly preferably, an aqueous solution of hydrogen bromide or an alkali metal bromide, in particular sodium bromide, or an aqueous solution of the alkali metal bromide is used. This embodiment makes the process of particular economic interest, since the costs for additional operating media can be kept low. In addition preference is given to an embodiment in which the bromine compound or the mixture of various bromine compounds consists of bromine-rich wastes, for example low or high halogenated liquid wastes, which are a component of the material to be incinerated or are added to the material to be incinerated, for example hazardous waste.

The inventive process takes place in the presence of a sulphur compound. The addition of a bromine compound in accordance with the inventive process leads to a gas-phase reaction between mercury and bromine in the presence of sulphur dioxide. Since under the combustion processes and other high-temperature processes customary in the context of this invention, sulphur dioxide is generally formed, generally a sufficient supply of a sulphur compound is present for the inventive process. A sufficient supply in the context of this invention is present when, with addition of a bromine compound to the furnace, the content of sulphur dioxide in the flue gas upstream of the flue gas emission control system is significantly greater than zero. However, if in a combustion process sulphur dioxide is not formed, or sufficient sulphur dioxide is not formed, a sulphur compound must be fed to the process. This can be in the form of free or bound sulphur, for example sulphur granules, waste sulphuric acid or other high-sulphur wastes. In addition, in particular to decrease an excessive content of free halogens in the flue gas, a sulphur compound can also be added, if, for example, more bromine compound has been fed than is necessary to oxidize the mercury present. A sulphur compound can be added, for example, according to the process described in the patent application DE 10131464, which was unpublished at the priority date of the present application, for low-corrosion and low-emission co-combustion of high-halogenated wastes in waste incineration plants. According to this process, in the primary and/or secondary combustion chamber, sulphur or a corresponding sulphur source is added in a controlled manner. The amount of sulphur is controlled essentially in proportion to the instantaneous total halogen load introduced together with the wastes in the boiler flue gas. The added sulphur burns in the combustion chamber to form sulphur dioxide which leads within the boiler to a substantial suppression of free halogens in the boiler flue gas, which halogens are formed in the interim, and subsequently to stable halogen incorporation in the alkaline scrubber. The addition of sulphur is controlled in such a manner that the preset sulphur dioxide content in the flue gas at the boiler inlet or the preset sulphur dioxide residual content at the boiler exit, that is to say in the dirty boiler gas upstream of, for example, wet flue gas emission control, can be maintained via a simple primary control circuit in steady state operating conditions.

If specifically sodium bromide is added to the furnace, an increased consumption of sulphur dioxide is to be observed, which is due to the sulphation of the sodium bromide in the high-temperature region.

On the other hand, a relatively high content of a sulphur compound, in particular sulphur dioxide, in the flue gas is not a disadvantage for the inventive process. A high content of sulphur dioxide can occur, for example, in the combustion of bituminous coals which customarily contain from 0.5 to 1% by weight of sulphur, or in the event of controlled addition of a sulphur compound which is added to suppress free halogens formed in the interim (see above). Under the given conditions of a high-temperature process, in the presence of excess sulphur dioxide, mercury oxidation also takes place, which is achieved by the inventive process by adding one or more bromine compounds. Herein is a particular advantage of the present process, since the oxidation of mercury by adding bromine compounds is found to be substantially insensitive to an excess of sulphur dioxide, unlike that due to the addition of chlorine compounds.

The addition of a bromine compound and if appropriate a sulphur compound is made according to the invention to the furnace and/or to the flue gas in a plant section downstream of the furnace, the temperature during the first contact of the bromine compound with the flue gas being at least 500° C., preferably at least 800° C. The bromine compound, for example, sodium bromide, can be added in solid form, for example as salt, or in liquid form, for example as aqueous solution, to the waste mixture, coal or the like to be burnt, upstream of the furnace. The addition can also be made to a plant section upstream of the furnace, for example a pyrolysis drum, which serves, for example, for the thermal breakdown of co-incinerated waste materials, or to a coal mill. The compound can also be fed during the combustion process. If the furnace comprises a plurality of stages, for example a primary and a secondary furnace, the bromine compound can be introduced, likewise in solid or liquid form, into one or both combustion chambers, for example into the rotary kiln and/or the afterburning chamber. Preferably, an aqueous solution of the compound is sprayed into one of the combustion chambers. In addition, it can also be added after the combustion, for example in a downstream waste-heat boiler, provided that the flue gas temperature is sufficiently high, that is to say at least 500° C., in particular at least 800° C. In other high-temperature processes, for example cement kilning, the hot oven top of the cement rotary kiln and/or the fired deacidification stage of the downstream cement raw mill preheater, for example, are supplied with the bromine compound.

In a further embodiment of the inventive process, it is also possible to feed the bromine compound, for example an aqueous solution of hydrogen bromide or sodium bromide, at a fine dispersion to the combustion air and/or if appropriate to a recirculated substream, in particular recirculated flue gas, recirculated ash and recirculated fly ash.

In order to achieve mercury oxidation as complete as possible, in particular 100%, by adding a bromine compound, the bromine compound is preferably added in a mass ratio of bromine to mercury in the range from $10^2$ to $10^4$. If the bromine compound is added in a great excess, this does not have a disadvantageous effect on the inventive process. Too great an excess must be avoided, however, not at least for reasons of cost. If appropriate, free halogens formed in the interim, for example free bromine, must be suppressed or incorporated in a stable manner by adding a sulphur compound (see above), since bromine emissions are generally also subject to legally established limiting values.

Mercury can in principle also be oxidized by chlorine compounds or iodine compounds. However, it has been found that bromine compounds oxidize mercury more effectively under the given conditions of high-temperature processes, such as temperature and in particular also at a high sulphur dioxide content (see above) than chlorine compounds. Iodine compounds oxidize mercury more effectively compared with bromine compounds. However, from economic aspects, bromine compounds are preferably used in the inventive process. Chlorine compounds or iodine compounds possibly present in the wastes, for example in hazardous waste, therefore contribute to mercury oxidation. In a preferred embodiment, the inventive process proceeds, in addition to the bromine compounds, in the presence of chlorine and/or iodine and/or a chlorine compound and/or an iodine compound and/or a mixture of such compounds. The chlorine compound and/or iodine compound can be fed, for example, in the form of high-chlorine or high-iodine wastes as a supplement to, or partial replacement of, the added bromine compound.

According to the inventive process, after the combustion or similar high-temperature process with addition of a bromine compound, cleanup of the flue gas occurs, as a result of which the oxidized mercury is removed from the flue gas as thoroughly as possible. Various flue gas cleanup processes are known from the prior art for removing, inter alia, ionic mercury. They are based either on wet scrubbing or dry cleanup or a combination of the two and may be multistage. Wet scrubbing comprises, for example, an acid scrubbing, which is performed, for example, in a quench sprayed with circulated scrubbing water, a pressurized nozzle scrubber or rotary atomizer scrubber or a packed-bed scrubber. Scrubbing can also be carried out, if appropriate, under weakly acidic or alkaline conditions only, for example in the case of low hydrogen chloride loads, but high sulphur dioxide loads.

In a preferred embodiment, the flue gas emission control system comprises multistage wet flue gas scrubbing having at least one strongly acid (pH less than 1) and/or at least one weakly acid and/or at least one alkaline scrubbing stage.

The flue gas emission control system can also comprise a dry emission control system based on the adsorption of ionic mercury compounds. Such a cleanup can be carried out, for example, by semi-dry desulphurization in a spray-dryer which is impinged with a milk of lime/carbon suspension, or using fixed-bed adsorbers, for example based on granulated activated carbon or oven coke or mixtures of such adsorbers with granular lime, or using pneumatic adsorbers, for example electrostatic precipitators (ESPs), or using cloth filters which are impinged with a blown-in finely pulverulent slaked lime/activated carbon or slaked lime/lignite coal coke mixture. Zeolites are also suitable for removing mercury compounds. With respect to dry flue gas emission control, a further advantage is exhibited of the inventive process. The use of the process is of interest in particular for those high-temperature plants which do not have a wet flue gas emission control system, but solely have a dry emission control system having a mercury sorption stage. Mercury bromide $HgBr_2$ adsorbs more strongly to dry sorbents than mercury chloride $HgCl_2$. For example, mercury adsorption intensifies on the fly ash of ESPs.

In a preferred embodiment the flue gas emission control system therefore comprises at least one dry or semi-dry adsorption-based emission control stage, in particular using electrostatic or filtering dust separators.

Furthermore, the fly ash loaded with mercury from any dust separators present is given a secondary, preferably thermal, treatment to decrease mercury load, in particular in a rotary drum heated to temperatures of at least 200° C.

Preferably, in the inventive process, the mercury content of the flue gas, in particular the content of metallic mercury, is measured continuously downstream of the flue gas emission control system and on the basis of the measured mercury content the amount of bromine fed and/or bromine compounds and/or the mixture of bromine compounds and if appropriate sulphur and/or sulphur substances and/or the mixture of sulphur substances is controlled. A relatively high content of metallic mercury in the flue gas is an indicator for the fact that the oxidation of mercury is proceeding incompletely and thus the mercury is being removed incompletely in the flue gas emission control system. In order to oxidize mercury as completely as possible, in such a case more bromine compound must be fed. In addition, the content of ionic mercury downstream of the flue gas emission control system can be measured and the degree of removal of ionic mercury in the flue gas emission control system can be determined therefrom. The content of metallic mercury and if appropriate of total mercury in the boiler exit gas can be measured, for example, using a differential absorption photometer, after appropriate gas treatment. Continuous measurement of metallic mercury, and if appropriate also of total mercury in the clean gas downstream of the wet and/or dry flue gas emission control system is performed preferably before any downstream SCR denitrification plant present (SCR: selective catalytic reduction), since the metal oxide-rich fixed-bed catalyst adsorbs considerable amounts of metallic mercury.

BRIEF DESCRIPTION OF THE DRAWINGS

The invention is described in more detail below on the basis of the examples with reference to the accompanying drawings. In the drawings

EXAMPLES

Figure 1:
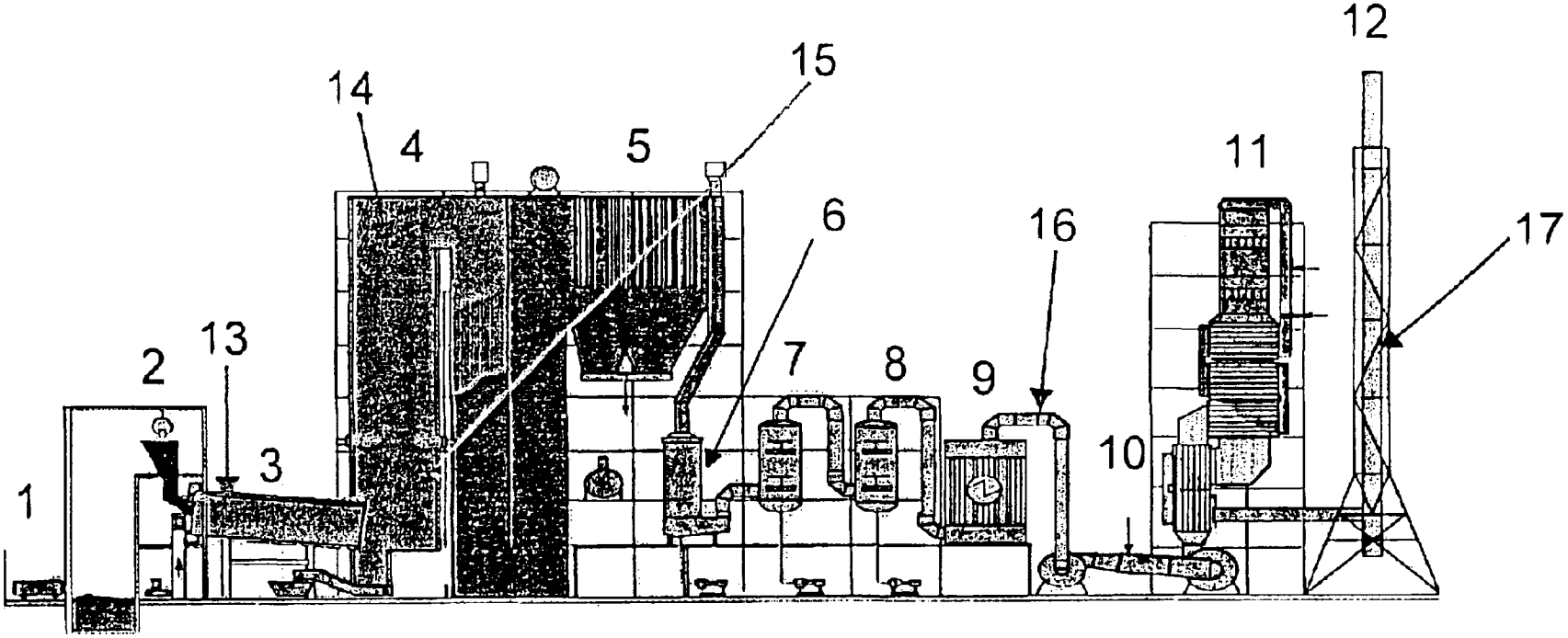
FIG. 1 shows a diagram of a special waste incineration plant

Examples 1-4 have been carried out in a special hazardous incineration plant of Bayer AG in Leverkusen corresponding to the diagram in FIG. 1. The rotary kiln 3 as primary combustion chamber is fired with solid waste from the bunker 1 via a crane grab 2, with liquid waste from a liquid waste tank and with waste drams via a dram feeder. The afterburning chamber 4, as a secondary combustion chamber, is also fired with liquid waste. The flue gas is cooled via the waste-heat boiler 5 and then, as what is termed dirty boiler gas, fed to the wet flue gas emission control system (multistage scrubber), which encompasses a quench 6, an acid rotary atomizer scrubber 7, an alkaline rotary atomizer scrubber 8 and an electrostatic gas cleanup system involving partial condensation of steam 9. Via suction fans 10 the scrubbed dirty gas, as what is termed clean gas, passes into the downstream catalytic denitrification plant 11 (selective catalytic denitrification of the clean gas by means of ammonia) and is emitted from there via the stack 12. The metallic mercury content ($Hg_{met}$) and if appropriate the total mercury content ($Hg_{tot}$) in the scrubbed clean gas downstream of the ESP/partial condensation was, after appropriate treatment, determined continuously at the measuring point 16 using a differential absorption photometer. The total mercury content ($Hg_{tot}$) in the emitted clean gas was determined semi-continuously at the measuring point 17, that is to say at a stack height of 22 m, by amalgamation on a gold film heated at intervals using the following differential absorption photometer.

Example 5 describes the use of the inventive process in a coal-fired power station of Bayer AG in Uerdingen, which essentially consists of a slag-tap fired boiler and a flue gas emission control system typical of a power station consisting of a dry electrostatic precipitator (ESP), a weakly acidic wet scrubber based on limestone for flue gas desulphurization and an SCR denitrification plant (SCR: selective catalytic reduction).

Example 1

Over a period of 116 minutes, a series of samples of metallic mercury in plastic capsules (in total 3400 g, see Table 1) were fed to the secondary combustion chamber (afterburning chamber 4) via the inspection port 15. The feed was performed at intervals of approximately 5-10 minutes with increasing amount of mercury. The mercury introduced vaporizes within approximately 2-4 minutes; therefore, the instantaneous peak mercury concentrations occurring in the boiler flue gas at a volume flow rate of approximately $45 \cdot 10^3$ m$^3$ S.T.P. db/h can be estimated. The estimation at the end of the experiment gives peak mercury concentrations of more than $130 \cdot 10^3$ μg/m$^3$ S.T.P. db.

TABLE 1

| Addition of Hg samples | | | |
|---|---|---|---|
| Time | Hg amount [g] | Time | Hg amount [g] |
| 9:24 | 5 | 10:32 | 180 |
| 9:32 | 10 | 10:37 | 200 |
| 9:38 | 15 | 10:43 | 220 |
| 9:49 | 20 | 10:48 | 240 |
| 9:54 | 40 | 10:53 | 260 |
| 9:59 | 60 | 10:58 | 280 |
| 10:04 | 80 | 11:03 | 300 |
| 10:09 | 100 | 11:08 | 310 |
| 10:15 | 120 | 11:13 | 320 |
| 10:20 | 140 | 11:20 | 340 |
| 10:26 | 160 | | |
| Experimental time [min] | | Total Hg amount [g] | |
| 116 | | 3400 | |

Figure 2:
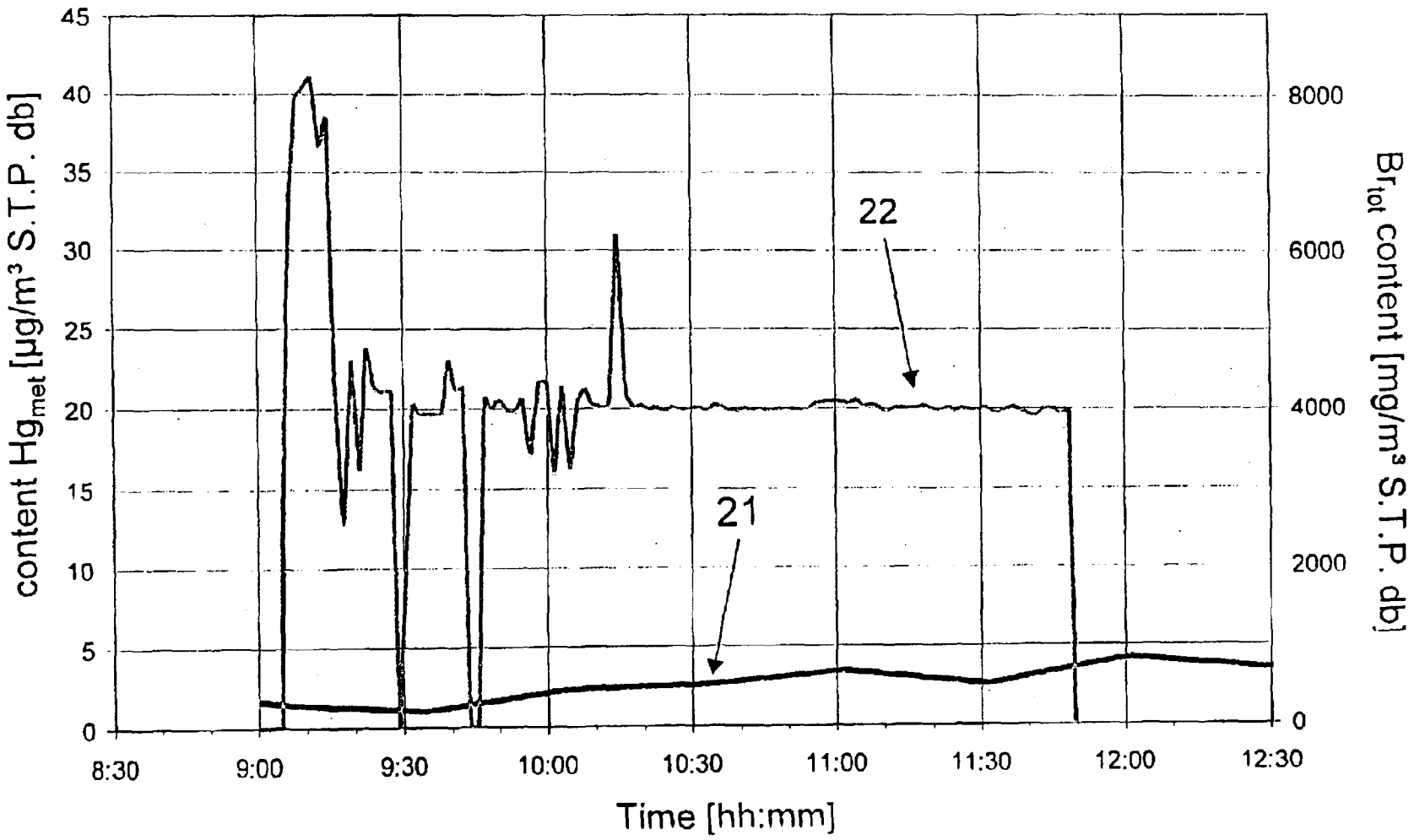
FIG. 2 shows a diagram which plots the content of metallic mercury ($Hg_{met}$) in the scrubbed boiler flue gas, that is to say in the clean gas, downstream of the wet scrubber, in $\mu g/m^3$ S.T.P. db (curve 21, left y axis) and the content of total bromine ($Br_{tot}$) in the boiler flue gas in $mg/m^3$ S.T.P. db (curve 22, right y axis) as a function of time.

During the experimental period, by co-combustion of a highly brominated liquid waste (addition to the rotary kiln head *at injection point 13*) in the boiler flue gas of $45 \cdot 10^3$ m$^3$ S.T.P. db/h, a bromine content of approximately $4 \cdot 10^3$ mg/m$^3$ S.T.P. db was maintained, as shown by curve 22 (right y axis) in FIG. 2 (determined on the basis of throughput and bromine content of the highly brominated liquid waste). The residual $SO_2$ content in the dirty boiler gas upstream of the quench was here set unusually high to $5.5 \cdot 10^3$ mg/Nm$^3$ S.T.P. db by adding sulphur granules to the rotary kiln head (direct $SO_2$ measurement in the dirty boiler gas upstream of the quench). This ensured that a sufficient supply of sulphur dioxide for the inventive process was available. The remaining material for combustion consisted of solid wastes and low-chlorinated solvents. Before, during and after the addition of mercury, at measurement point 16, that is to say downstream of the flue gas emission control system, the content of mercury in the flue gas was measured. As curve 21 (left y axis) in FIG. 2 shows, despite the addition of considerable amounts of mercury, the content of metallic mercury passing through the scrubber virtually does not increase.

Furthermore, Table 2 lists the instantaneous discharge rates of mercury at 11:30, that is to say shortly after addition of the last mercury sample and thus at the timepoint of the highest mercury concentration, which were discharged with the effluent scrubbing waters of the wet flue gas emission control system. Extensive wastewater-side measurements confirm that approximately 99.93% of the total mercury input were discharged as ionic mercury together with the wastewater of the strongly acid quench (pH less than 1) and approximately 0.066% were discharged with the wastewater of the alkaline rotary atomizer scrubber (pH approximately 7.5). The small residue, not scrubbed out, of only 0.004% of the total mercury input was discharged as metallic mercury together with the scrubbed clean gas. Virtually no $Hg_{ion}$ was detectable in the scrubbed clean gas ($Hg_{ion}$=zero, that is to say complete scrubbing of ionic mercury and thus $Hg_{tot}=Hg_{met}$).

TABLE 2

| Instantaneous mercury discharge rates [g/h] at 11:30 | |
|---|---|
| Quench (including the acid rotary atomizer scrubber) | 1931 |
| (Acid rotary atomizer scrubber, effluent of which is recirculated to the quench) | (468) |
| Alkaline rotary atomizer scrubber | 1.32 |

TABLE 2-continued

| Instantaneous mercury discharge rates [g/h] at 11:30 | |
|---|---|
| Scrubbed clean gas downstream of ESP/condensation | 0.069 |

Example 2

Figure 3:
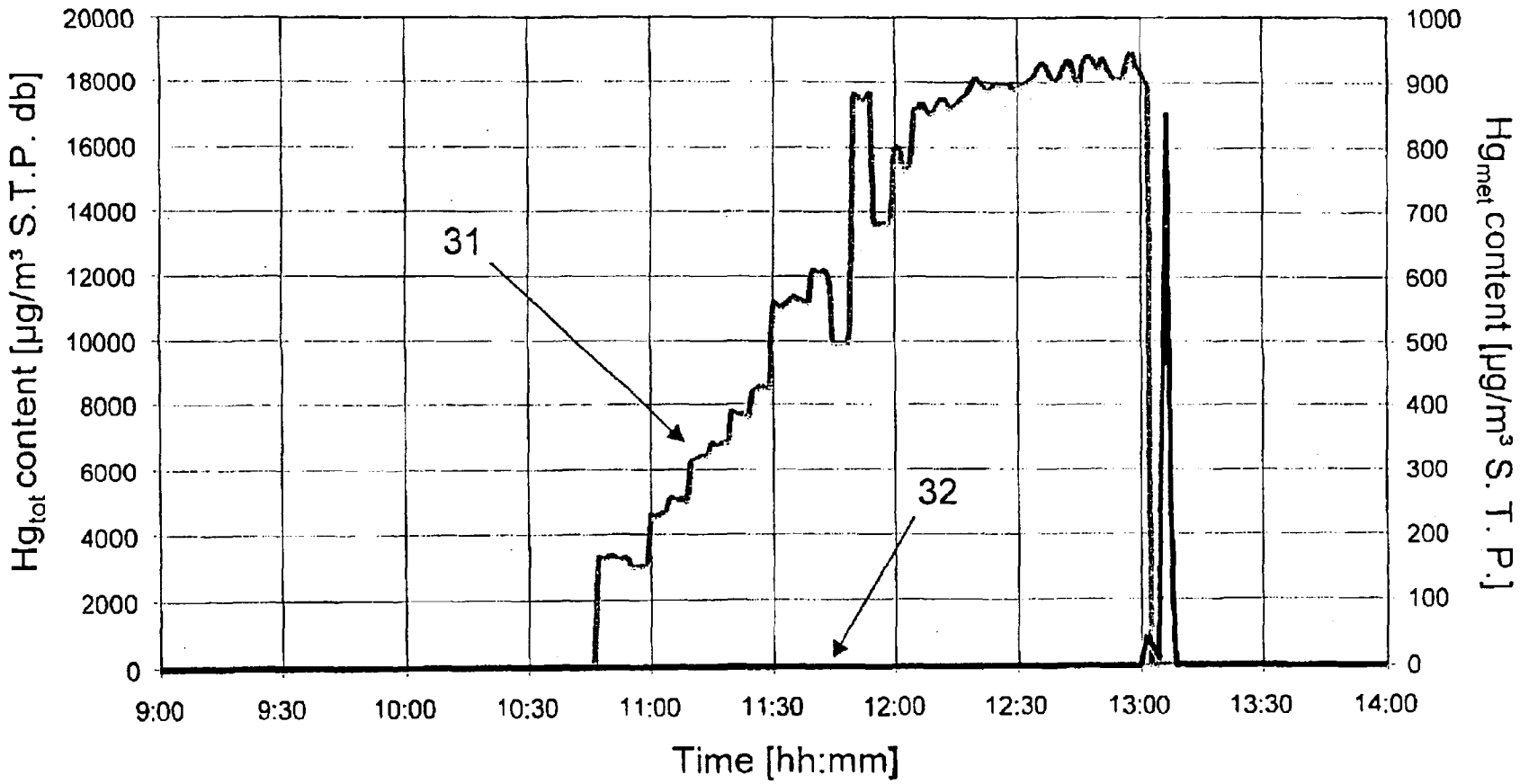
FIG. 3 shows a diagram which plots the content of total mercury ($Hg_{tot}$) in the boiler flue gas, that is to say also the dirty boiler gas, upstream of the wet scrubber, in $\mu g/m^3$ S.T.P. db (curve 31, left y axis) and the content of metallic mercury ($Hg_{met}$) in the clean gas downstream of the wet scrubber, in $\mu g/m^3$ S.T.P. db (curve 32, right y axis), as a function of time.

Over a period of 130 minutes, an aqueous $HgCl_2$ solution was fed continuously to the secondary combustion chamber (afterburning chamber 4) via a nozzle in the afterburning chamber roof. The rate added was increased here at intervals of about 5 minutes. FIG. 3 shows the increase in mercury concentration thus induced in the boiler flue gas in the time between approximately 10:45 and 13:00. The mercury introduced is immediately released in the afterburning chamber as metallic mercury $Hg_{met}$. The total mercury concentration in the boiler flue gas increased in this manner to values of $18 \cdot 10^3$ μg/m$^3$ S.T.P db (curve 31 and left y axis). The Hg concentration in the boiler flue gas was calculated from the mercury addition rate and the flue gas volume flow rate measured operationally. During the experimental period, by co-incineration of a highly brominated liquid waste (addition via a burner at the rotary kiln head) a bromine content of approximately $9 \cdot 10^3$ mg/m$^3$ S.T.P. db was maintained in the boiler flue gas of $45 \cdot 10^3$ m$^3$ S.T.P. db/h (determination based on throughput and bromine content of the co-incinerated highly brominated liquid waste). The residual $SO_2$ content in the dirty boiler gas upstream of the quench was set here by adding sulphur granules to the rotary kiln head to approximately $4 \cdot 10^3$ mg/Nm$^3$ S.T.P. db (direct $SO_2$ measurement in the dirty boiler gas upstream of the quench).

In the period between approximately 11:00 and 13:00, in the scrubbed clean gas downstream of the ESP/condensation, a concentration of metallic mercury of less than 10 μg/m$^3$ S.T.P. db was found. Here also virtually no $Hg_{ion}$ was detectable in the scrubbed clean gas ($Hg_{ion}$=zero, that is to say complete scrubbing of the ionic mercury and thus $Hg_{tot}=Hg_{met}$). During a brief interruption of bromine addition at 13:05, the concentration of $Hg_{met}$ jumped to approximately 800 μg/m$^3$ S.T.P. db, but immediately returned to its low starting value of less than 10 μg/m$^3$ S.T.P. db when bromine addition started again (curve 32 and right y axis).

Example 3

In the time between approximately 8:30 and 14:45, that is say over a period of 675 minutes, an aqueous $HgCl_2$ solution was fed continuously to the secondary combustion chamber (afterburning chamber 4) via a nozzle in the afterburning chamber roof. However, the Hg flowrate added was this time kept constant, corresponding to a mercury concentration in the boiler flue gas of approximately $9.6 \cdot 10^3$ μg/m$^3$ S.T.P. db.

Figure 4:
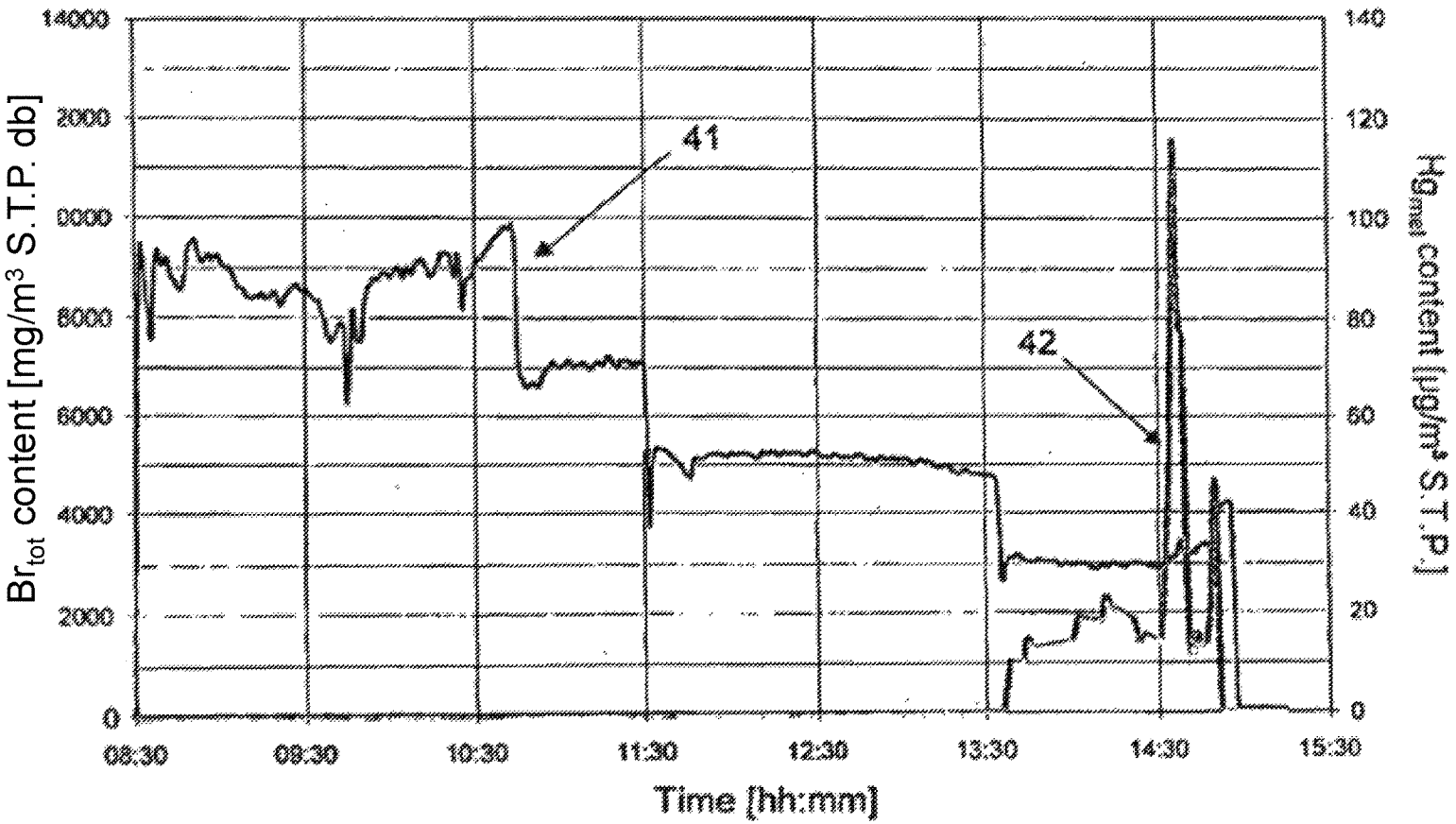
FIG. 4 shows a diagram which plots the content of total bromine ($Br_{tot}$) in the boiler flue gas, that is to say also the dirty boiler gas, upstream of the wet scrubber, in $mg/m^3$ S.T.P. db (curve 41, left y axis) and the content of metallic mercury ($Hg_{met}$) in the clean gas downstream of the wet scrubber, in $\mu g/m^3$ S.T.P. db (curve 42, right y axis) as a function of time.

In this experimental period (see FIGS. 4 and 5), bromine was added in the form of a highly brominated liquid waste via a burner at the rotary kiln head, but the added bromine flowrate was decreased stepwise, which decreased the bromine content in the boiler flue gas stepwise from approximately $9 \cdot 10^3$ to approximately $3 \cdot 10^3$ mg/m$^3$ S.T.P. db (curve 41 in FIG. 4 and left y axis). The residual $SO_2$ content in the dirty boiler gas, induced by adding sulphur granules, was again selected very high at approximately $4.3 \cdot 10^3$ mg/m$^3$ S.T.P. db in this experimental period. In addition to the highly brominated liquid waste, a chlorinated liquid waste was also co-incinerated.

Figure 5:
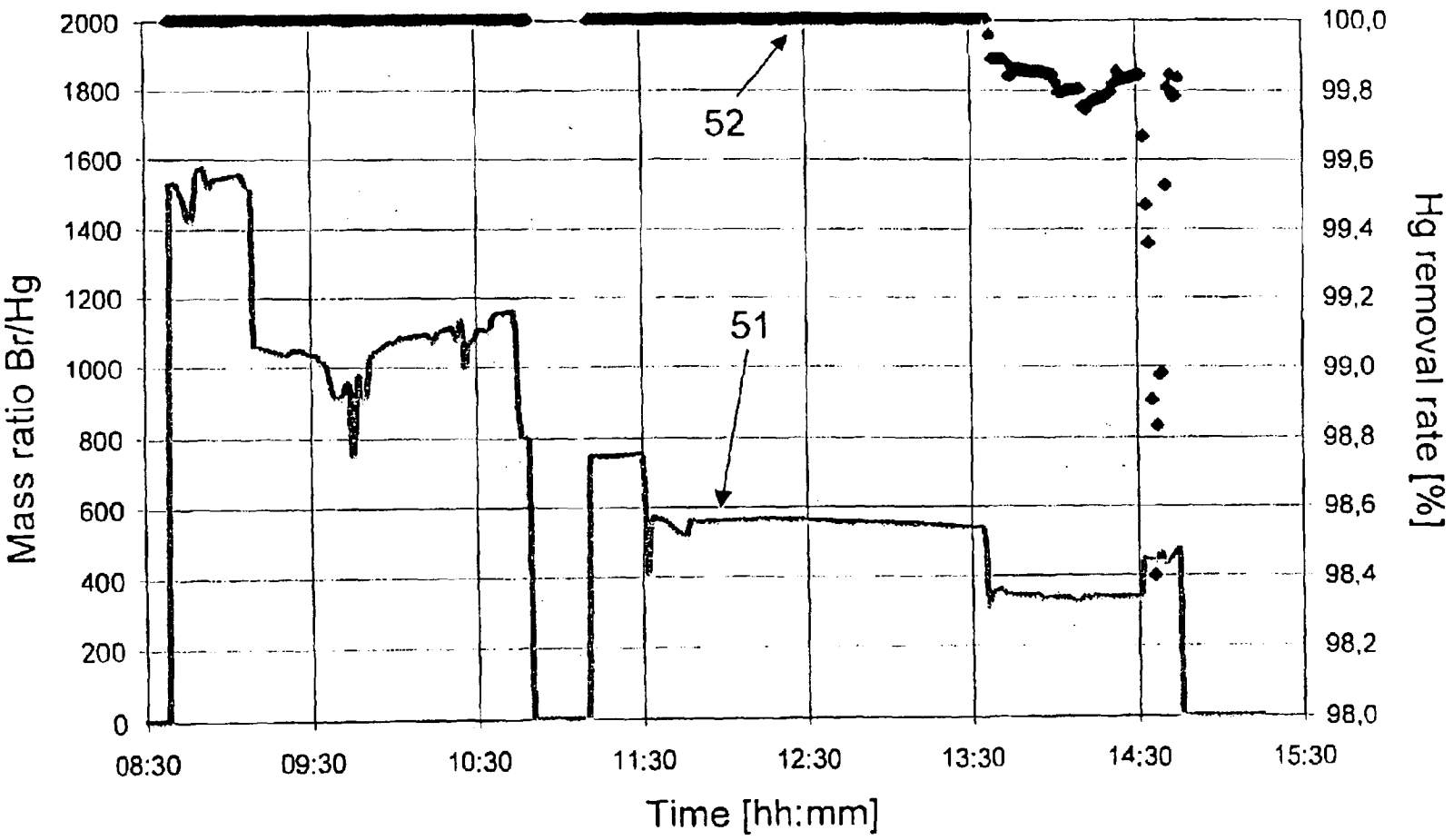
FIG. 5 shows a diagram which plots the mass ratio of bromine to mercury in the boiler flue gas (curve 51, left y axis) and the total degree of mercury removal achieved in the multistage wet scrubber, in % (curve 52, right y axis) as a function of time.

As can be seen in FIG. 4 and FIG. 5, the metallic mercury content in the scrubbed clean gas downstream of the ESP condensation was significantly less than 2 μg/m$^3$ S.T.P. db (curve 42 in FIG. 4 and right y axis). Here also virtually no $Hg_{ion}$ was detectable in the scrubbed clean gas ($Hg_{ion}$=zero, that is to say complete scrubbing of the ionic mercury and thus $Hg_{tot}=Hg_{met}$). Correspondingly, the degree of removal of mercury in the wet scrubber was significantly greater than 99.98% (curve 52 in FIG. 5 and right y axis), as long as the bromine content was greater than $3 \cdot 10^3$ mg/m$^3$ S.T.P. db (curve 41 and left y axis) or the bromine/mercury mass ratio was greater than 500 μg of bromine/μg of mercury (curve 51 in FIG. 5 and lefty axis). At about 13:30 the bromine content in the flue gas decreases to $3 \cdot 10^3$ μg/m$^3$ S.T.P. db and the bromine/mercury mass ratio to approximately 335 μg of bromine/μg of mercury. The metallic mercury concentration downstream of the wet scrubber increases here to up to 20 μg/m$^3$ S.T.P. db (curve 42 in FIG. 4 and left y axis) and the Hg removal rate decreases to 99.8% (curve 52 in FIG. 5 and right y axis). Furthermore, a brief interruption in chlorine addition shortly after 14:30 leads to a peak concentration of metallic mercury downstream of the scrubber of approximately 117 μg/m$^3$ S.T.P. db (curve 42 in FIG. 4 and left y axis) and to a brief fall in removal rate to approximately 98.4% (curve 51 in FIG. 5 and right y axis). The comparatively small effect of chlorine compared with bromine is marked here.

Example 4

Figure 6:
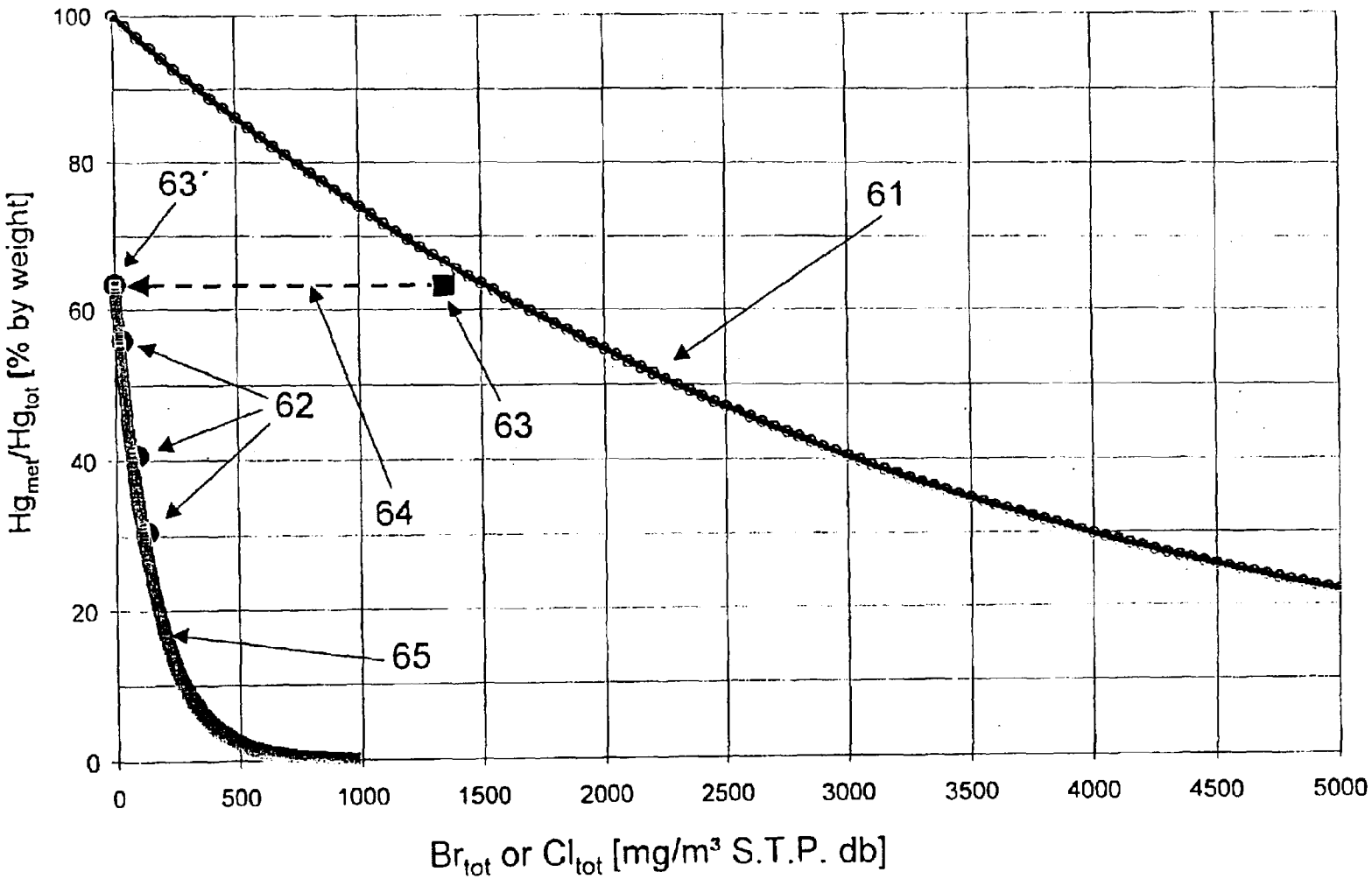
FIG. 6 shows a diagram which plots the weight ratio of metallic mercury to the total of metallic and ionic mercury ($Hg_{met}/Hg_{tot}$), that is to say the proportion of $Hg_{met}$ species in the dirty boiler gas, in % by weight as a function of total chlorine content (curve 61) and of total bromine content (curve 62) in the dirty boiler gas, in $mg/m^3$ S.T.P. db.

FIG. 6 illustrates an experiment comparing the action of bromine and chlorine on the oxidation of mercury in the boiler flue gas of the above described hazardous waste incineration plant. In this study, an $Hg_{tot}$ content set by adding $HgCl_2$ of 130 μg/m$^3$ S.T.P. db was available at a chlorine content ($Cl_{tot}$) set by co-incineration of low-chlorine solvent in the boiler flue gas at $1.35 \cdot 10^3$ mg/m$^3$ S.T.P. db and at a residual sulphur dioxide content in the dirty boiler gas set by adding sulphur granules of $1.5 \cdot 10^3$ mg/m$^3$ S.T.P. db. Measurement point 63 shows the proportion of $Hg_{met}$ species achieved initially without bromine addition, that is to say solely via chlorine, of approximately 63% by weight in the dirty boiler gas upstream of the wet scrubber. The plant-specific curve 61 which is based on approximately 20 operational experiments on a hazardous waste incineration plant with incineration of highly chlorinated liquid waste shows how the proportion of $Hg_{met}$species ($Hg_{met}/Hg_{tot}$) decreases with increasing chlorine content $Cl_{tot}$ in the boiler flue gas.

Starting from a proportion of $Hg_{met}$ species of approximately 63% by weight in the dirty boiler gas upstream of the wet scrubber (measurement point 63 with $Cl_{tot}$ content as x axis and measurement point 63' with $Br_{tot}$ content as x axis), an increasing amount of a bromine compound was then added in three steps (see arrow 64 which marks the transition from the plot of the proportion of $Hg_{met}$ species as a function of $Cl_{tot}$ content to the plot as a function of $Br_{tot}$ content). The bromine content in the boiler flue gas was increased here from initially 0 mg/m$^3$ S.T.P. db (measurement point 63' with $Br_{tot}$ content as x axis) by adding aqueous hydrogen bromide solution or aqueous sodium bromide solution (injection on the afterburning chamber roof 14, FIG. 1) in three steps to 50, 100 and 120 mg/m$^3$ S.T.P. db (measurement point 62 with $Br_{tot}$ content as x axis). In this experiment the proportion of $Hg_{met}$ species ($Hg_{met}/Hg_{tot}$) in the dirty boiler gas upstream of the wet scrubber (starting from approximately 63% by weight) decreased to 30% by weight.

The comparison is evidence for the markedly more effective oxidation of mercury by bromine compounds compared with chlorine compounds in the example of a hazardous waste incineration plant. To achieve a proportion of $Hg_{met}$ species of only 30% using chlorine alone, the $Cl_{tot}$ content, according to the chlorination curve 61, would have to be increased to $4 \cdot 10^3$ mg/m$^3$ S.T.P. db. Instead of this, this is achieved using only 120 mg/m$^3$ S.T.P. db of bromine. Bromine therefore appears to be about 25 fold more active than chlorine. The Hg bromination curve 65 ($Br_{tot}$ content as x axis), taking into account this factor, corresponds to the completely measured Hg chlorination curve 61 ($Cl_{tot}$ content as x axis). The same applies to the case of power station flue gases where, however, the plant-specific Hg chlorination curve and the corresponding Hg bromination curve 65 are shifted to substantially lower halogen contents.

Example 5

Figure 7:
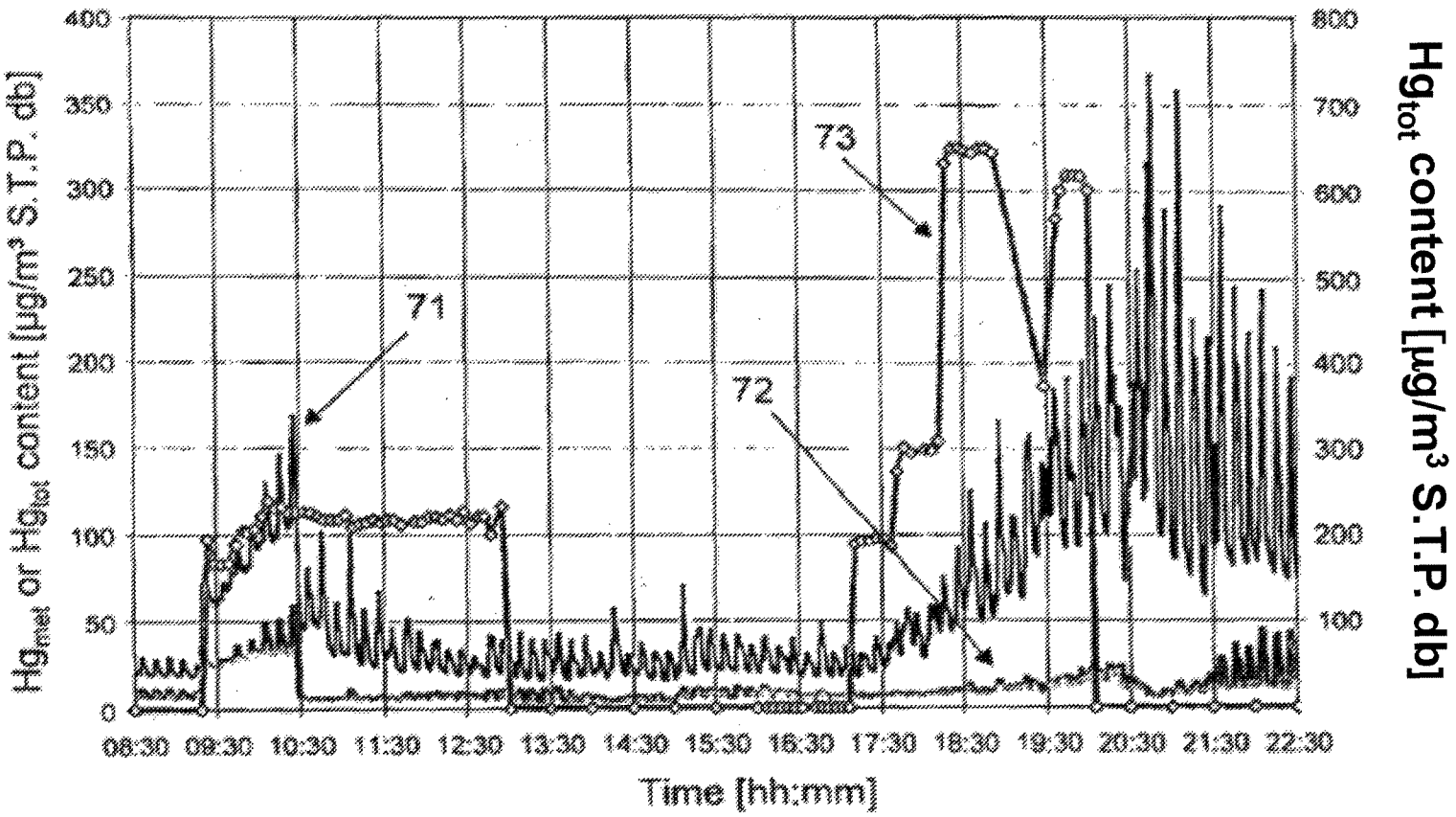
FIG. 7 shows a diagram which plots the total mercury content ($Hg_{tot}$) in the dedusted dirty gas downstream of the electrostatic precipitator (curve 71, left y axis) and the content of metallic mercury ($Hg_{met}$) downstream of the so electrostatic precipitator (curve 72, left y axis) and the increase in total mercury content ($Hg_{tot}$) in the boiler flue gas induced by mercury addition (curve 73, right y axis) as a function of time.
Figure 8:
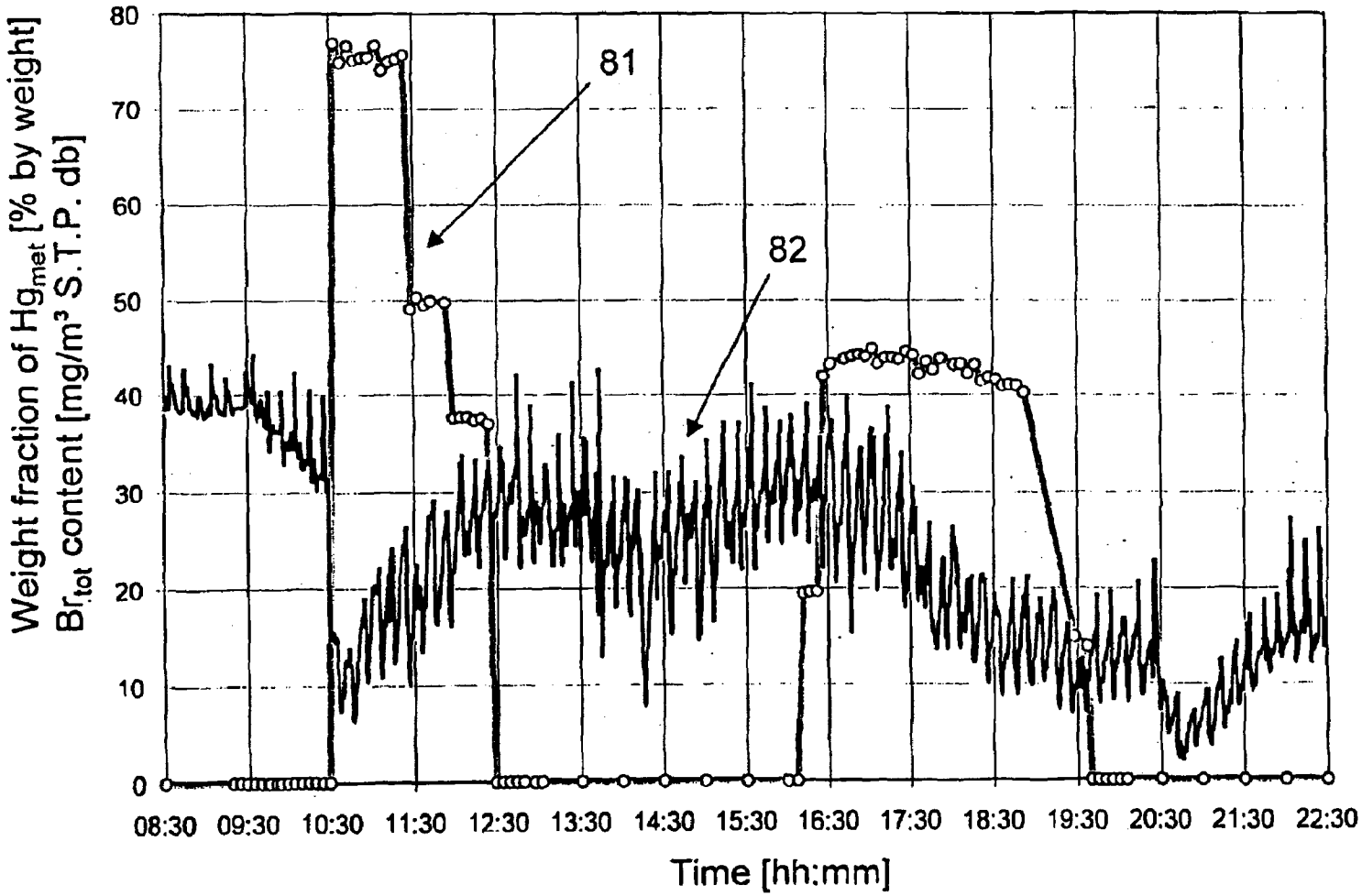
FIG. 8 shows a diagram which plots the weight ratio of metallic mercury ($Hg_{met}$) to the total of metallic and ionic mercury ($Hg_{tot}$), that is to say the proportion of $Hg_{met}$ species ($Hg_{met}/Hg_{tot}$) in the dedusted dirty boiler gas downstream of the electrostatic precipitator, in % by weight (curve 82) and the total bromine content ($Br_{tot}$) in the boiler flue gas, in mg/m$^3$ S.T.P. db (curve 81) as a function of time.
Figure 9:
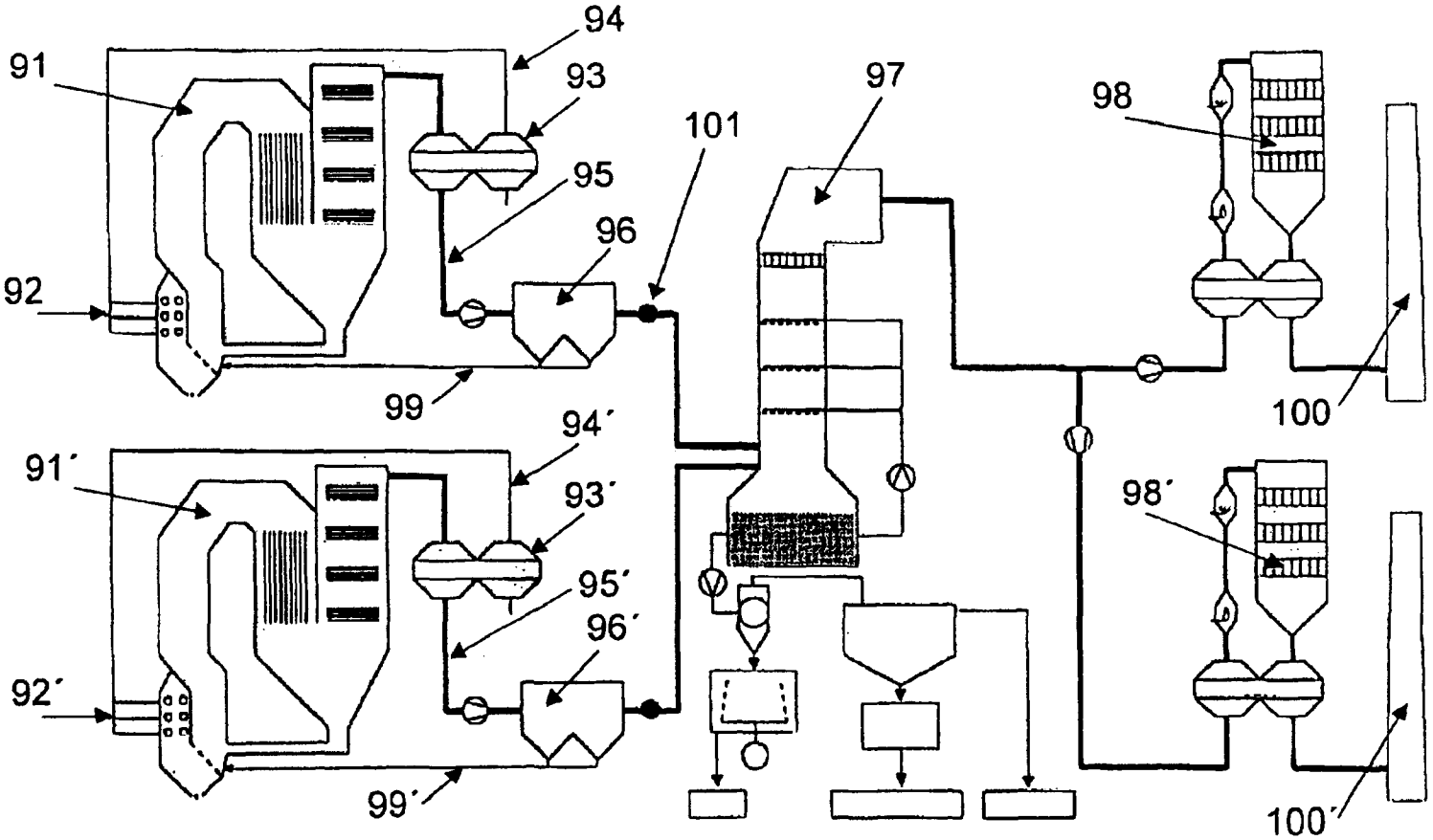
FIG. 9 shows a diagram of an industrial power station having two slag-tap fired boilers.

FIGS. 7 and 8 illustrate experiments to demonstrate the effect of bromine on mercury removal in a coal-fired power station of Bayer AG in Uerdingen (see FIG. 9). In the coal-fired power station, an experiment was carried out with addition of aqueous $HgCl_2$ solution and aqueous NaBr solution into the combustion chamber to demonstrate the effect of bromine on Hg oxidation. The power station comprises two parallel slag-tap fired boilers 91, 91' having temperatures in the combustion chamber around 1450° C. The slag-tap fired boilers 91, 91' are charged with coal 92, 92'. Via the respective air preheaters 93, 93', fresh air 94, 94' is fed to the slag-tap fired boilers 91, 91'. The dirty boiler gas 95, 95' is fed via electrostatic precipitators (ESPs) 96, 96' to the shared weakly acidic (pH=5.3) wet scrubber as flue gas desulphurization system (FGD scrubber) 97. The scrubbed boiler flue gas (clean gas) is then transferred to two parallel catalytic denitrification plants (SCR denitrification plants) 98, 98', before it is emitted via stacks 100, 100'. The fly ash 99, 99' removed in the ESPs is 100% recycled to the furnace of the respective slag-tap fired boiler. The contents of $Hg_{met}$ and $Hg_{tot}$ in the dedusted dirty boiler gas are measured continuously at the measurement point 101 downstream of the ESP 96.

No sulphur was added. The sulphur dioxide content in the boiler flue gas of 1.3·103 S.T.P. db resulted solely from the sulphur of the burnt coal itself. The total mercury content in the dedusted dirty gas downstream of the ESP, that is to say upstream of the wet scrubber, at the start with pure coal combustion (bituminous coal) was on average only 22.5 μg/m$^3$ S.T.P. db, see FIG. 7, curve 71 (total mercury content $Hg_{tot}$) at 8:30, and the content of metallic mercury was on average only 8.8 μg/m$^3$ S.T.P. db, see FIG. 7, curve 72 (metallic mercury content $Hg_{met}$) at 8:30. The indentation of both curves 71, 72 in a 10 minute cycle is based on the regular rapping of the ESP; as a result of this, immediately after cleaning off the dust layers, higher contents occur in the dedusted dirty boiler gas downstream of the ESP. At 9:15 the addition of mercury to the combustion chamber was started (as aqueous $HgCl_2$ solution) and at 10:30, then the addition of bromine to the combustion chamber was also started (as aqueous NaBr solution). The curve 73 (FIG. 7, right y axis) depicts the increase in $Hg_{tot}$ content in the boiler flue gas due to addition of mercury. Between approximately 9:30 and 13:00, the increase in total mercury content in the flue gas upstream of the ESP, induced by $HgCl_2$ addition, was at least approximately 220 μg/m$^3$ S.T.P. db (curve 73, right y axis). Curve 81 in FIG. 8 depicts the increase in Br content in the boiler flue gas induced by adding aqueous NaBr solution. At 10:30 the bromine content in the flue gas upstream of the ESP was initially increased by at least 75 mg/m$^3$ S.T.P. db and decreased again stepwise. At 16:10, there was a renewed increase in bromine content by approximately 43 mg/m$^3$ S.T.P. db. Because of the recirculation of the fly ash to the slag-tap fired furnace and thus also the recirculation of the mercury and bromine sorbed to the fly ash, these are minimum increases, as result from the rates added and the flue gas volume flow rate (approximately $110 \cdot 10^3$ m$^3$ S.T.P. db/h). The actual Hg and Br contents in the dirty gas upstream of the ESP are accordingly somewhat higher (circuit between slag-tap fired furnace and ESP).

Curves 71 and 72 (left y axis) in FIG. 7 show how the mercury content in the flue gas markedly decreases with addition of the bromine compound. This applies firstly to the ionic mercury (difference between $Hg_{tot}$ and $Hg_{met}$), which is increased in formation in the presence of the bromine compound and is apparently adsorbed to the recirculated fly ash, but secondly applies still more to metallic mercury, the content of which in the dedusted dirty gas downstream of the ESP, despite the addition of mercury, decreases approximately to the initial content before mercury addition. From 10:30 to 13:00 (end of the Br addition) and far beyond the $Hg_{met}$ content was less than 10 μg/m$^3$ S.T.P. db. Not until the end of the renewed addition of sodium bromide solution at 19:00 did the $Hg_{tot}$ content markedly increase. Furthermore, the curve 82 in FIG. 8 shows the initially abrupt decrease in proportion of metallic mercury species with addition of bromine (decrease from approximately 40% by weight to approximately 10% by weight at 10:30). Similar results after approximately 17:00 with the renewed addition of mercury and bromine are found in the gradual decrease of the proportion of $Hg_{met}$ species to approximately 5% by weight at 20:45. As a result of the Hg addition and the increased Hg adsorption, the Hg content in the ESP fly ash recycled to the slag-tap fired furnace increased from initially approximately 2-5 mg/kg in the course of the experiment to 55 mg/kg.

We claim:

~~1. Process for removing mercury from mercury-containing flue gases of a furnace within which a combustion or incineration is carried out, wherein~~

~~bromine, a bromine compound, a mixture of bromine compounds or a mixture of bromine and a bromine compound or compounds, is fed to the furnace or to the flue gas of the furnace in a plant section downstream of the furnace, or to both the furnace and the flue gas, the temperature during the first contact of the bromine or of said mixture with the flue gas being at least 500° C.,~~

~~the combustion or incineration is carried out in the presence of a sulphur compound,~~

~~and then the flue gas is subjected to a cleanup for removing mercury from the flue gas.~~

~~2. Process according to claim 1, wherein the bromine compound is an aqueous solution of hydrogen bromide, an alkali metal bromide, or a mixture thereof.~~

~~3. The process according to claim 2, wherein said bromine compound is sodium bromide.~~

~~4. Process according to claim 1, wherein the bromine compound or said mixture or both are liquid or solid bromine-rich wastes.~~

~~5. Process according to claim 1, wherein the bromine, the bromine compound or the mixture is added to combustion air supplied to the furnace, to a recycled flue gas stream, a recycled fly ash or any combination thereof.~~

~~6. Process according to claim 1, wherein the mass ratio of bromine to mercury in the flue gas is in the range from $10^2$ to $10^4$.~~

~~7. Process according to claim 1, wherein the combustion or incineration is carried out additionally in the presence of chlorine, a chlorine compound, a mixture of chlorine compounds, iodine, an iodine compound, a mixture of iodine compounds or combination thereof.~~

~~8. Process according to claim 1, wherein the furnace is provided with a flue gas emission control system comprising a multistage wet flue gas scrubber having at least one strongly acidic scrubbing, at least one weakly acidic scrubbing stage, at least one alkaline scrubbing stage, or a combination of said scrubbing stages.~~

~~9. Process according to claim 8, wherein the mercury content of the flue gas is measured continuously downstream of the flue gas emission control system and the amount of bromine, bromine compounds fed and any sulphur or sulphur compounds fed is controlled on the basis of the measured mercury content.~~

~~10. The process according to claim 8, wherein said emission control system comprises filtration, electrostatic separation or both.~~

~~11. The process according to claim 10, wherein fly ash loaded with mercury is recovered from said filtration or electrostatic separation and is subjected to a thermal secondary treatment to decrease mercury load in a rotary drum heated to temperatures of at least 200° C.~~

~~12. Process according to claim 1, wherein the furnace is provided with a flue gas emission control system comprising at least one dry or semi dry absorption based emission control stage.~~

~~13. The process according to claim 1, wherein the temperature during the contact of the bromine compound or mixture with the flue gas is at least 800° C.~~

~~14. The process according to claim 1, wherein said sulphur compound is sulphur dioxide.~~

15. Process for removing mercury from mercury-containing flue gases of a furnace within which a combustion or incineration is carried out, wherein bromine, a bromine compound, a mixture of bromine compounds or a mixture of bromine and a bromine compound or compounds, is fed to the furnace or to the flue gas of the furnace in a plant section downstream of the furnace, or to both the furnace and the flue gas, the temperature during the first contact of the bromine, *said bromine compound, said mixture of bromine compounds* or of said mixture *of bromine and a bromine compound or compounds* with the flue gas being at least 500° C., the combusion or incineration is carried out in the presence of a sulphur compound, and then the flue gas is subjected to a cleanup for removing mercury from the flue gas, wherein the temperature during the contact of the bromine [compound], *said bromine compound, said mixture of bromine compounds* or *of said* mixture *of bromine and a bromine compound or compounds* with mercury-containing flue gas is at least 800° C. and wherein the cleanup for removing mercury from the mercury-containing flue gas substantially removes mercury from the mercury-containing flue gas and includes atleast one of a wet scrubbing stage and a dry cleanup stage, the dry cleanup stage comprising at least one sorbent, and wherein sulphur, a sulphur compound or a mixture of sulphur compounds is added to said furnace based on [measuring] *a measured* mercury content of the mercury-containing flue gas.

~~16. The process according to claim 1, wherein said furnace is a multistage furnace.~~

*17. A process for removing mercury from mercury-containing flue gases of a furnace, comprising:*

*carrying out a combustion or incineration process, within the furnace, in the presence of a sulphur compound;*

*feeding bromine, a bromine compound, a mixture of bromine compounds or a mixture of bromine and one or more bromine compounds to at least one of the furnace or a flue gas of the furnace in a plant section downstream from the furnace, a temperature at first contact of the bromine, bromine compound, mixture of bromine compounds, or mixture of bromine and one or more bromine compounds with the mercury-containing flue gas being at least 800° C.; and*

*subjecting the mercury-containing flue gas to a cleanup for substantially removing mercury from the mercury-containing flue gas, wherein the cleanup for substantially removing mercury from the mercury-containing flue gas includes a dry cleanup stage comprising at least one sorbent; and*

*the process further comprising adding sulphur, a sulphur compound or a mixture of sulphur compounds to said furnace based on a measured mercury content of the mercury-containing flue gas.*

*18. A process for removing mercury from mercury-containing flue gases of a furnace, comprising:*

*carrying out a combustion or incineration process, within the furnace, in the presence of a sulphur compound;*

*feeding bromine, a bromine compound, a mixture of bromine compounds or a mixture of bromine and one or more bromine compounds to at least one of the furnace or a flue gas of the furnace in a plant section downstream from the furnace, a temperature at first contact of the bromine, bromine compound, mixture of bromine compounds, or mixture of bromine and one or more bromine compounds with the mercury-containing flue gas being at least 800° C.; and*

*subjecting the mercury-containing flue gas to a cleanup for substantially removing mercury from the mercury-containing flue gas, wherein the cleanup for substantially removing mercury from the mercury-containing flue gas includes a dry cleanup stage comprising at least one sorbent; and*

*wherein feeding the bromine, bromine compound, mixture of bromine compounds or mixture of bromine and one or more bromine compounds to the furnace comprises:*

*applying the bromine, bromine compound, mixture of bromine compounds or mixture of bromine and one or more bromine compounds in an aqueous solution of the bromine, bromine compound, mixture of bromine compounds or mixture of bromine and one or more bromine compounds to a waste feed for a waste incineration process; and*

*feeding the waste feed to the furnace,*

*the process further comprising adding sulphur, a sulphur compound or a mixture of sulphur compounds to said furnace based on measured mercury content of the mercury-containing flue gas.*

*19. Process for removing mercury from mercury-containing flue gas of a furnace within which a combustion or incineration of coal containing sulfur is carried out, comprising the steps of:*

*feeding bromine to the mercury-containing flue gas, the temperature during the first contact of the bromine with the mercury-containing flue gas being at least 800° C., and the combustion or incineration being carried out in the presence of a sulphur compound such that a gas phase reaction takes place between the bromine and the*

*mercury so as to produce a bromine-contacted mercury-containing flue gas wherein the mercury is essentially completely oxidized;*

*wherein said bromine is selected from the group consisting of bromine, a bromine compound, a mixture of bromine compounds and a mixture of bromine and a bromine compound or compounds, and wherein the feeding step feeds bromine to the furnace or to the flue gas of the furnace in a plant section downstream of the furnace, or to both the furnace and the flue gas; and*

*subjecting the bromine-contacted mercury-containing flue gas to a cleanup for removing oxidized mercury whereby mercury is substantially removed from the bromine-contacted mercury-containing flue gas, wherein the cleanup includes at least one of a wet scrubbing stage and a dry cleanup stage, the dry cleanup stage comprising at least one sorbent.*

*20. Process according to claim 19, wherein the feeding step comprises mixing the bromine with the coal to be combusted in the furnace, or upstream of the furnace.*

*21. Process according to claim 19, wherein the bromine compound is an aqueous solution of hydrogen bromide, an alkali metal bromide, or a mixture thereof.*

*22. Process according to claim 21, wherein the bromine compound is sodium bromide.*

*23. Process according to claim 19, wherein the bromine is liquid or solid bromine-rich wastes.*

*24. Process according to claim 19, wherein the bromine, is added to combustion air supplied to the furnace, to a recycled flue gas stream, a recycled fly ash or any combination thereof.*

*25. Process for removing mercury from mercury-containing flue gas of a furnace within which a combustion or incineration of coal containing sulfur is carried out, comprising the steps of:*

*feeding bromine to the mercury-containing flue gas, the temperature during the first contact of the bromine with the mercury-containing flue gas being at least 800° C., and the combustion or incineration being carried out in the presence of a sulphur compound such that a gas phase reaction takes place between the bromine and the mercury so as to produce a bromine-contacted mercury-containing flue gas wherein the mercury is essentially completely oxidized;*

*wherein said bromine is selected from the group consisting of bromine, a bromine compound, a mixture of bromine compounds and a mixture of bromine and a bromine compound or compounds, and wherein the feeding step feeds bromine to the furnace or to the flue gas of the furnace in a plant section downstream of the furnace, or to both the furnace and the flue gas; and*

*subjecting the bromine-contacted mercury-containing flue gas to a cleanup for removing oxidized mercury whereby mercury is substantially removed from the bromine-contacted mercury-containing flue gas, wherein the cleanup includes at least one of a wet scrubbing stage and a dry cleanup stage, the dry cleanup stage comprising at least one sorbent, wherein the mass ratio of bromine to mercury in the flue gas is in the range from $10^2$ to $10^4$.*

*26. Process according to claim 19, wherein the combustion or incineration is carried out additionally in the presence of chlorine, a chlorine compound, a mixture of chlorine compounds, iodine, an iodine compound, a mixture of iodine compounds or combination thereof.*

*27. Process according to claim 19, wherein the furnace is provided with a flue gas emission control system comprising a multistage wet flue gas scrubber having at least one strongly acidic scrubbing, at least one weakly acidic scrubbing stage, at least one alkaline scrubbing stage, or a combination of said scrubbing stages.*

*28. Process according to claim 27, wherein the mercury content of the mercury-containing flue gas is measured continuously downstream of the flue gas emission control system and the amount of bromine fed and any sulphur or sulphur compounds fed is controlled on the basis of the measured mercury content.*

*29. Process according to claim 27, wherein said emission control system comprises filtration, electrostatic separation or both.*

*30. Process according to claim 29, wherein fly ash loaded with mercury is recovered from said filtration or electrostatic separation and is subjected to a thermal secondary treatment to decrease mercury load in a rotary drum heated to temperatures of at least 200° C.*

*31. Process according to claim 19, wherein the furnace is provided with a flue gas emission control system comprising at least one dry or semi-dry absorption based emission control stage.*

*32. Process according to claim 19, wherein said sulphur compound is sulphur dioxide.*

*33. Process according to claim 19, wherein said furnace is a multistage furnace.*

*34. Process for removing mercury from mercury-containing flue gas of a furnace within which a combustion or incineration of coal containing sulfur is carried out, comprising the steps of:*

*feeding bromine to the mercury-containing flue gas, the temperature during the first contact of the bromine with the mercury-containing flue gas being at least 800° C., and the combustion or incineration being carried out in the presence of a sulphur compound such that a gas phase reaction takes place between the bromine and the mercury so as to produce a bromine-contacted mercury-containing flue gas wherein the mercury is essentially completely oxidized;*

*wherein said bromine is selected from the group consisting of bromine, a bromine compound, a mixture of bromine compounds and a mixture of bromine and a bromine compound or compounds, and wherein the feeding step feeds bromine to the furnace or to the flue gas of the furnace in a plant section downstream of the furnace, or to both the furnace and the flue gas; and*

*subjecting the bromine-contacted mercury-containing flue gas to a cleanup for removing oxidized mercury whereby mercury is substantially removed from the bromine-contacted mercury-containing flue gas, wherein the cleanup includes at least one of a wet scrubbing stage and a dry cleanup stage, the dry cleanup stage comprising at least one sorbent, wherein the feeding step is carried out by adding bromine in an amount such that the gas phase reaction essentially completely oxidizes the mercury in the mercury-containing flue gas.*

* * * * *